US005598229A

United States Patent [19]

Okada et al.

[11] Patent Number: 5,598,229

[45] Date of Patent: Jan. 28, 1997

[54] METHOD AND APPARATUS FOR LIQUID CRYSTAL DISPLAY TO ACHIEVE SMOOTH TRANSITIONS BETWEEN THE JUMPING OF SCANNING LINES

[75] Inventors: Shinjiro Okada, Isehara; Yutaka Inaba, Kawaguchi; Kazunori Katakura, Atsugi, all of Japan

[73] Assignee: Canon Kabushiki Kaisha, Tokyo, Japan

[21] Appl. No.: 538,039

[22] Filed: Oct. 2, 1995

Related U.S. Application Data

[63] Continuation of Ser. No. 171,180, Dec. 22, 1993, abandoned.

[30] Foreign Application Priority Data

Dec. 24, 1992 [JP] Japan .................................... 4-357213

[51] Int. Cl.[6] ................................ H04N 3/14; G09G 3/36

[52] U.S. Cl. ................................................ 348/792; 345/97

[58] Field of Search .................................... 348/792, 793; 345/97, 101; H04N 3/14

[56] References Cited

U.S. PATENT DOCUMENTS 5,091,723 2/1992 Kanno et al. ......................... 345/97 X 5,136,282 8/1992 Inaba et al. ............................ 340/784

FOREIGN PATENT DOCUMENTS 0416172 3/1991 European Pat. Off. .

0545400 6/1993 European Pat. Off. .

*Primary Examiner*—Victor N. Kostak

*Assistant Examiner*—John W. Miller

*Attorney, Agent, or Firm*—Fitzpatrick, Cella, Harper & Scinto

[57] ABSTRACT

A liquid crystal device is constituted by a first electrode substrate having thereon a group of scanning lines, a second electrode substrate having thereon a group of data lines intersecting the scanning lines, and a liquid crystal disposed between the scanning lines and the data lines so as to form a pixel at each intersection of the scanning lines and the data lines. The liquid crystal device is driven by a driving method including a first mode operation for displaying a picture by line-sequential scanning, and a second mode operation including jumping of scanning lines from a final scanning line to a resumption scanning line during one picture scanning, wherein the final scanning line and/or the resumption scanning line is selected twice.

10 Claims, 9 Drawing Sheets

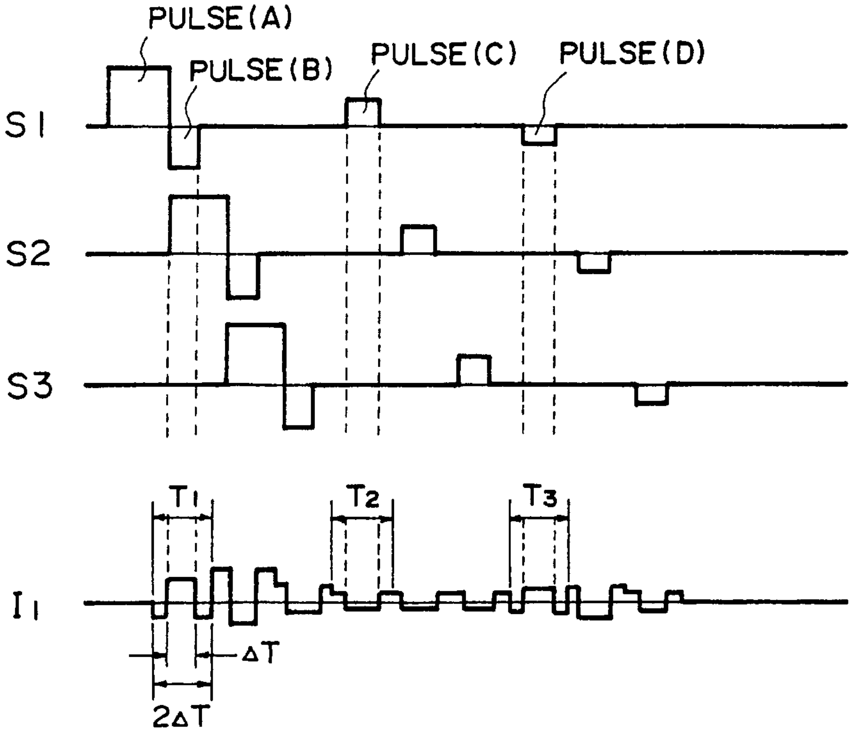
FIG.5(a) PRIOR ART
FIG.5(b) PRIOR ART
FIG.5(c) PRIOR ART
FIG.5(d) PRIOR ART
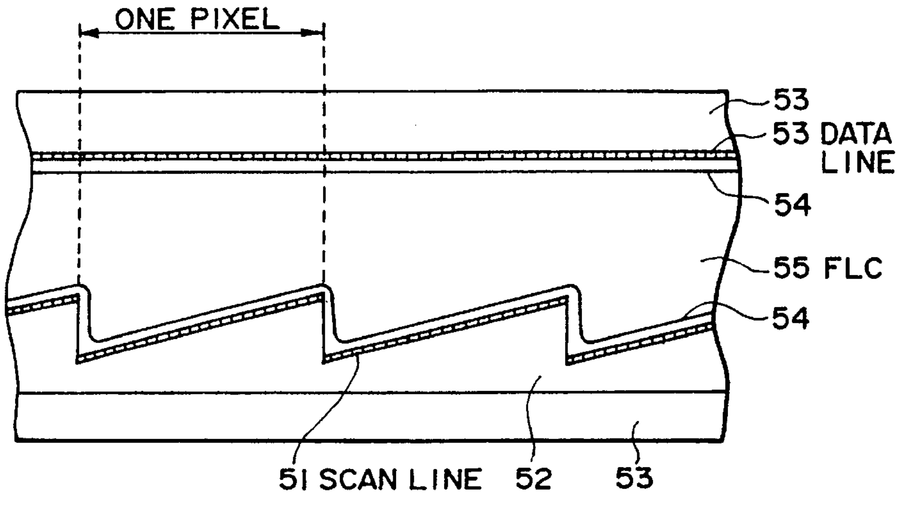
FIG. 6
PRIOR ART

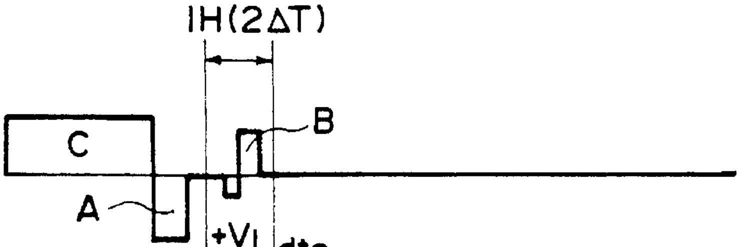
FIG.13(a) S1
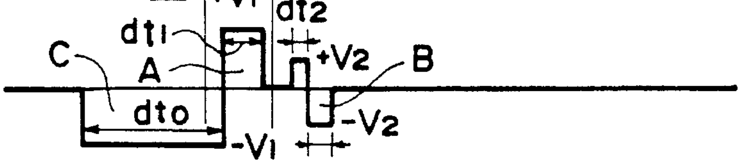
FIG.13(b) S2
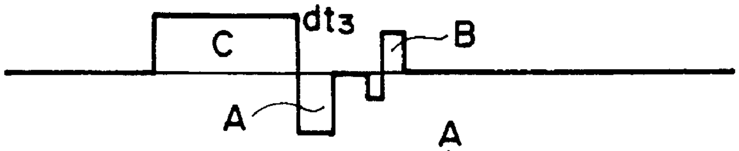
FIG.13(c) S3
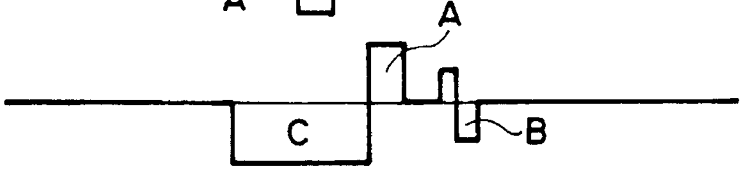
FIG.13(d) S4
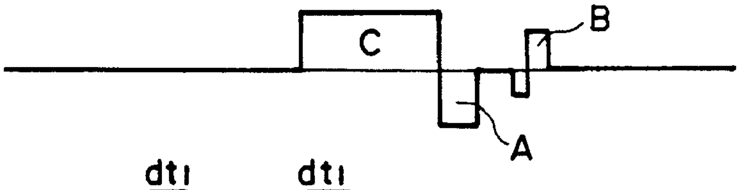
FIG.13(e) S5
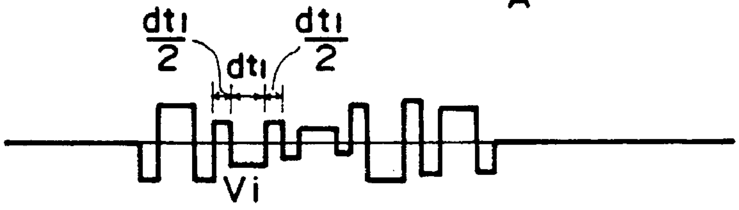
FIG.13(f) I
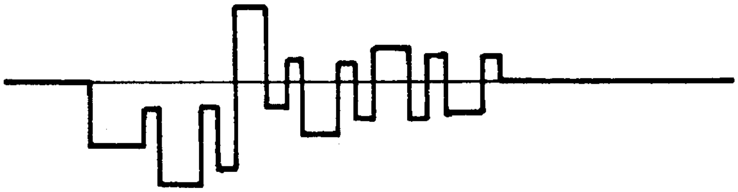
FIG.13(g) S2-I
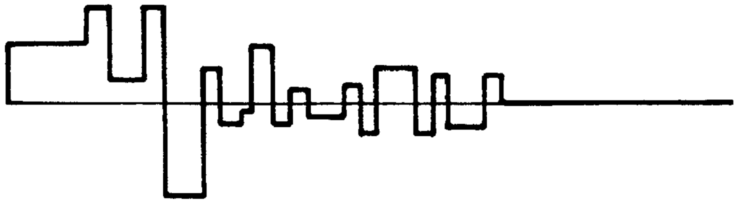
FIG.13(h) S1-I

METHOD AND APPARATUS FOR LIQUID CRYSTAL DISPLAY TO ACHIEVE SMOOTH TRANSITIONS BETWEEN THE JUMPING OF SCANNING LINES

This application is a continuation of application Ser. No. 08/171,180 filed Dec. 22, 1993, now abandoned.

FIELD OF THE INVENTION AND RELATED ART

The present invention relates to a method and an apparatus for liquid crystal display for computer terminals, television receivers, word processors, typewriters, etc., inclusive of a light valve for projectors, a view finder for video camera recorders, etc.

There have been known liquid crystal display devices including those using twisted-nematic (TN) liquid crystals, guest-host(GH)-type liquid crystals, cholesteric (Ch) liquid crystals, smectic (Sm) liquid crystals, etc.

Among these, a TN-liquid crystal can effect a halftone display by multiplexing drive according to the active matrix system but the response characteristic thereof is not very good. In contrast thereto a ferroelectric liquid crystal device using an Sm liquid crystal shows a high speed responsiveness.

Clark and Lagerwall have disclosed a bistable ferroelectric liquid crystal device using a surface-stabilized ferroelectric liquid crystal in, e.g., Applied Physics Letters, Vol. 36, No. 11 (Jun. 1, 1980), p.p. 899–901; Japanese Laid-Open Patent Application (JP-A) 56-107216, U.S. Pat. Nos. 4,367,924 and 4,563,059. Such a bistable ferroelectric liquid crystal device has been realized by disposing a liquid crystal between a pair of substrates disposed with a spacing small enough to suppress, the formation of a helical structure inherent to liquid crystal molecules in chiral smectic C phase (SmC*) or H phase (SmH*) of bulk state and align vertical (smectic) molecular layers each comprising a plurality of liquid crystal molecules in one direction.

Further, as a display device using such a ferroelectric liquid crystal (FLC), there is known one wherein a pair of transparent substrates respectively having thereon a transparent electrode and subjected to an aligning treatment are disposed to be opposite to each other with a cell gap of about 1–3 μm therebetween so that their transparent electrodes are disposed on the inner sides to form a blank cell, which is then filled with a ferroelectric liquid crystal, as disclosed in U.S. Pat. No. 4,639,089; 4,655,561; and 4,681,404.

The above-type of liquid crystal display device using a ferroelectric liquid crystal has two advantages. One is that a ferroelectric liquid crystal has a spontaneous polarization so that a coupling force between the spontaneous polarization and an external electric field can be utilized for switching. Another is that the long axis direction of a ferroelectric liquid crystal molecule corresponds to the direction of the spontaneous polarization in a one-to-one relationship so that the switching is effected by the polarity of the external electric field. More specifically, the ferroelectric liquid crystal in its chiral smectic phase shows bistability, i.e., a property of assuming either one of a first and a second optically stable state depending on the polarity of an applied voltage and maintaining the resultant state in the absence of an electric field. Further, the ferroelectric liquid crystal shows a quick response to a change in applied electric field. Accordingly, the device is expected to be widely used in the field of e.g., high-speed and memory-type display apparatus.

A ferroelectric liquid crystal generally comprises a chiral smectic liquid crystal (SmC* or SmH*), of which molecular long axes form helixes in the bulk state of the liquid crystal. If the chiral smectic liquid crystal is disposed within a cell having a small gap of about 1–3 μm as described above, the helixes of liquid crystal molecular long axes are unwound (N. A. Clark, et al., MCLC (1983), Vol. 94, p.p. 213–234).

A liquid crystal display apparatus having a display panel constituted by such a ferroelectric liquid crystal device may be driven by a multiplexing drive scheme as described in U.S. Pat. No. 4,655,561, issued to Kanbe et al to form a picture with a large capacity of pixels. The liquid crystal display apparatus may be utilized for constituting a display panel suitable for, e.g., a word processor, a personal computer, a micro-printer, and a television set.

A ferroelectric liquid crystal has been principally used in a binary (bright-dark) display device in which two stable states of the liquid crystal are used as a light-transmitting state and a light-interrupting state but can be used to effect a multi-value display, i.e., a halftone display. In a halftone display method, the areal ratio between bistable states (light transmitting state and light-interrupting state) within a pixel is controlled to realize an intermediate light-transmitting state. The gradational display method of this type (hereinafter referred to as an "areal modulation" method) will now be described in detail.

FIGS. 1A and 1B constitute is a graph schematically representing a relationship between a transmitted light quantity I through a ferroelectric liquid crystal cell and a switching pulse voltage V. More specifically, FIG. 1A shows plots of transmitted light quantities I given by a pixel versus voltages V when the pixel initially placed in a complete light-interrupting (dark) state is supplied with single pulses of various voltages V and one polarity as shown in FIG. 1B. When a pulse voltage V is below threshold Vth (V<Vth), the transmitted light quantity does not change and the pixel state is as shown in FIG. 2B which is not different from the state shown in FIG. 2A before the application of the pulse voltage. If the pulse voltage V exceeds the threshold Vth (Vth<V<Vsat), a portion of the pixel is switched to the other stable state, thus being transitioned to a pixel state as shown in FIG. 2C showing an intermediate transmitted light quantity as a whole. If the pulse voltage V is further increased to exceed a saturation value Vsat (Vsat<V), the entire pixel is switched to a light-transmitting state as shown in FIG. 2D so that the transmitted light quantity reaches a constant value (i.e., is saturated). That is, according to the areal modulation method, the pulse voltage V applied to a pixel is controlled within a range of Vth<V<Vsat to display a halftone corresponding to the pulse voltage.

However, actually, the voltage (V) - transmitted light quantity (I) relationship shown in FIG. 1 depends on the cell thickness and temperature. Accordingly, if a display panel is accompanied with an unintended cell thickness distribution or a temperature distribution, the display panel can display different gradation levels in response to a pulse voltage having a constant voltage.

FIG. 3 is a graph for illustrating the above phenomenon which is a graph showing a relationship between pulse voltage (V) and transmitted light quantity (I) similar to that shown in FIG. 1 but showing two curves including a curve H representing a relationship at a high temperature and a curve L at a low temperature. In a display panel having a large display size, it is rather common that the panel is accompanied with a temperature distribution. In such a case, however, even if a certain halftone level is intended to be displayed by application of a certain drive voltage Vap, the resultant halftone levels can be fluctuated within the range of $I_1$ to $I_2$ as shown in FIG. 3 within the same panel, thus failing to provide a uniform gradational display state.

In order to solve the above-mentioned problem, our research and development group has already proposed a drive method (hereinafter referred to as the four pulse method") in U.S. patent appln. Ser. No. 681,933, filed Apr. 8, 1991. In the four pulse method, as illustrated in FIGS. 4 and 5, all pixels having mutually different thresholds on a common scanning line in a panel are supplied with plural pulses (corresponding to pulses (A)–(D) in FIG. 4) to show consequently identical transmitted quantities as shown at FIG. 4 at pulse (D). In FIG. 5, $T_1$, $T_2$ and $T_3$ denote selection periods set in synchronism with the pulses (B), (C) and (D), respectively. Further, $Q_0$, $Q_0'$, $Q_1$, $Q_2$ and $Q_3$ in FIG. 4 represent gradation levels of a pixel, inclusive of $Q_0$ representing black (0%) and $Q_0'$ representing white (100%). Each pixel in FIG. 4 is provided with a threshold distribution within the pixel increasing from the leftside toward the right side as represented by a cell thickness increase.

Our research and development group has also proposed a drive method (a so-called "pixel shift method", as disclosed in U.S. patent appln. Ser. No. 984,694, filed Dec. 2, 1991 and entitled "LIQUID CRYSTAL DISPLAY APPARATUS"), requiring a shorter writing time than in the four pulse method. In the pixel shift method, plural scanning lines are simultaneously supplied with different scanning signals for selection to provide an electric field intensity distribution spanning the plural scanning lines, thereby effecting a gradational display. According to this method, a variation in threshold due to a temperature variation can be absorbed by shifting a writing region over plural scanning lines.

An outline of the pixel shift method will now be described below.

A liquid crystal cell (panel) suitably used may be one having a threshold distribution within one pixel. Such a liquid crystal cell may for example have a sectional structure as shown in FIG. 6. The cell shown in FIG. 6 has an FLC layer 55 disposed between a pair of glass substrates 53 including one having thereon transparent stripe electrodes 53 constituting data lines and an alignment film 54 and the other having thereon a ripple-shaped film 52 of, e.g., an insulating resin, providing a saw-teeth shape cross section, transparent stripe electrodes 52 constituting scanning lines and an alignment film 54. In the liquid crystal cell, the FLC layer 55 between the electrodes has a gradient in thickness within one pixel so that the switching threshold of FLC is also caused to have a distribution. When such a pixel is supplied with an increasing voltage, the pixel is gradually switched from a smaller thickness portion to a larger thickness portion.

The switching behavior is illustrated with reference to FIG. 7A. Referring to FIG. 7A, a panel in consideration is assumed to have portions having temperatures $T_1$, $T_2$ and $T_3$. The switching threshold voltage of FLC is lowered at a higher temperature. FIG. 7A shows three curves each representing a relationship between applied voltage and resultant transmittance at temperature $T_1$, $T_2$ or $T_3$.

Incidentally, the threshold change can be caused by a factor other than a temperature change, such as a layer thickness fluctuation, but an embodiment of the present invention will be described while referring to a threshold change caused by a temperature change, for convenience of explanation.

As is understood from FIG. 7A, when a pixel at a temperature $T_1$ is supplied with a voltage Vi, a transmittance of X % results at the pixel. If, however, the temperature of the pixel is increased to $T_2$ or $T_3$, a pixel supplied with the same voltage Vi is caused to show a transmittance of 100%, thus failing to perform a normal gradational display. FIG. 7C shows inversion states of pixels after writing. Under such conditions, written gradation data is lost due to a temperature change, so that the panel is applicable to only a limited use of display device.

In contrast thereto, it becomes possible to effect a gradational display stable against a temperature change by display data for one pixel on two scanning lines S1 and S2 as shown in FIG. 7D.

The drive scheme will be described in further detail hereinbelow.

(1) A ferroelectric liquid crystal cell as shown in FIG. 6 having a continuous threshold distribution within each pixel is provided. It is also possible to use a cell structure providing a potential gradient within each pixel as proposed by our research and development group in U.S. Pat. No. 4,815,823 or a cell structure having a capacitance gradient. In any way, by providing a continuous threshold distribution within each cell, it is possible to form a domain corresponding to a bright state and a domain corresponding to a dark state in mixture within one pixel, so that a gradational display becomes possible by controlling the areal ratio between the domains.

The method is applicable to a stepwise transmittance modulation (e.g., at 16 levels) but a continuous transmittance modulation is required for an analog gradational display.

(2) Two scanning lines are selected simultaneously. The operation is described with reference to FIG. 8. FIG. 8A shows an overall transmittance—applied voltage characteristic for combined pixels on two scanning lines. In FIG. 8A, a transmittance of 0–100% is allotted to be displayed by a pixel B on a scanning line 2 and a transmittance of 100–200% is allotted to be displayed by a pixel A on a scanning line 1. More specifically, as one pixel is constituted by one scanning line, a transmittance of 200% is displayed when both the pixels A and B are wholly in a transparent state by scanning two scanning lines simultaneously. Herein, two scanning lines are selected for displaying one gradation data but a region having an area of one pixel is allotted to displaying one gradation data. This is explained with reference to FIG. 8B.

At temperature $T_1$, inputted gradation data is written in a region corresponding to 0% at an applied voltage $V_0$ and in a region corresponding to 100% at $V_{100}$. As shown in FIG. 8B, at temperature $T_1$, the range (pixel region) is wholly on the scanning line 2 (as denoted by a hatched region in FIG. 8B). When the temperature is raised from $T_1$ to $T_2$, however, the threshold voltage of the liquid crystal is lowered correspondingly, the same amplitude of voltage causes an inversion in a larger region in the pixel than at temperature $T_1$.

For correcting the deviation, a pixel region at temperature $T_2$ is set to span on scanning lines 1 and 2 (a hatched portion at $T_2$ in FIG. 8B).

Then, when the temperature is further raised to temperature $T_3$, a pixel region corresponding to an applied voltage in the range of $V_0$–$V_{100}$ is set to be on only the scanning line 1 (a hatched portion at $T_3$ in FIG. 8B).

By shifting the pixel region for a gradational display on two scanning lines depending on the temperature, it becomes possible to retain a normal gradation display in the temperature region of $T_1$–$T_3$.

(3) Different scanning signals are applied to the two scanning lines selected simultaneously. As described at (2)

above, in order to compensate for the change in threshold of liquid crystal inversion due to a temperature range by selecting two scanning lines simultaneously, it is necessary to apply different scanning signals to the two selected scanning lines. This point is explained with reference to FIG. 7.

Scanning signals applied to scanning lines 1 and 2 are set so that the threshold of a pixel B on the scanning line 2 and the threshold of a pixel A on the scanning line 1 varies continuously. Referring to FIG. 7B, a transmittance-voltage curve at temperature 1 indicates that a transmittance up to 100% is displayed in a region on the scanning line 2 and a transmittance thereabove and up to 200% is displayed in a region on the scanning line 1. It is necessary to set the transmittance curve so that it is continuous and has an equal slope spanning from the pixel B to the pixel A.

As a result, even if the pixel A on the scanning line 1 and the pixel B on the scanning line 2 are set to have identical cell shapes as shown in FIG. 9B, it becomes possible to effect a display substantially similar to that in the case where the pixel A and the pixel B are provided with a continuous threshold characteristic (cell at the right side of FIG. 7B).

It has been found desirable to set one-line selection time to be on the order of 60–100 μs for a ferroelectric liquid crystal device in view of delay in transmission of pulse waveform and avoidance of using a ferroelectric liquid crystal having a large spontaneous polarization.

However, when a high-definition display requiring more than 1000 scanning lines is considered, one-frame scanning time amounts to at least 60 μs×1000=60 ms, which corresponds to a frame frequency of 16.7 Hz. In line-sequential scanning, a frame frequency of 40 Hz is desired and should be at least 30 Hz so that rewriting of a picture appears to be continuous and smooth.

For example, in the case of a mouse cursor movement on a screen, the cursor image appears to be in pieces and the recognizability thereof becomes extremely inferior, thus resulting in poor display quality, if the frame frequency is below 40 Hz.

In order to improve such display quality of a ferroelectric liquid crystal (herein sometimes abbreviated as "FLC"), there has been proposed a driving method, wherein a part of screen expected to be rewritten locally is selectively subjected to line-sequential scanning (JP-A 60-31120, U.S. Pat. Nos. 4,655,561; 5,091,723; and 5,172,107).

As described above, in the above-mentioned pixel shift method wherein data is written so as to span adjacent two scanning lines, it is desired to effect non-interlaced line-sequential scanning.

However, when a picture is rewritten with jumping of scanning lines during the scanning on a panel drive for displaying data spanning two scanning lines in such a manner, there has been encountered a problem of incomplete display on a scanning line immediately before the jumping and a scanning line just preceding a scanning line of jumping destination due to a temperature deviation along the panel.

Further, when dummy scanning as proposed in U.S. patent application Ser. No. 041,420 (filed Mar. 31, 1993, entitled "Display Apparatus") is performed along with jumping of scanning lines regardless of the state of the jumping, flickering of a picture is, rather, caused.

Above-mentioned problems which have been described with reference to the pixel shift method using FLC, for example, for convenience of understanding, but such problems to be solved by the present invention are common to other display systems wherein prescribed data is displayed at a pixel spanning at least two selected scanning lines.

SUMMARY OF THE INVENTION

In view of the above-mentioned problems, an object of the present invention is to provide a driving method for a liquid crystal display device (panel) wherein display quality is not degraded even when scanning is started from or terminated at an intermediate part on the panel.

Another object of the present invention is to provide a driving method for a liquid crystal display device which is applicable to a driving scheme wherein gradational display quality is not degraded even if the panel is accompanied with a temperature distribution.

Another object of the present invention is to provide a liquid crystal display apparatus suitable for practicing the above-mentioned method.

According to the present invention, there is provided a driving method for a liquid crystal device of the type comprising a first electrode substrate having thereon a group of scanning lines, a second electrode substrate having thereon a group of data lines intersecting the scanning lines, and a liquid crystal disposed between the scanning lines and the data lines so as to form a pixel at each intersection of the scanning lines and the data lines, said driving method comprising:

a first mode operation for displaying a picture by line-sequential scanning, and a second mode operation including jumping of scanning lines from a final scanning line to a resumption scanning line during one picture scanning, wherein the final scanning line and/or the resumption scanning line is selected twice.

These and other objects, features and advantages of the present invention will become more apparent upon a consideration of the following description of the preferred embodiments of the present invention taken in conjunction with the accompanying drawings.

BRIEF DESCRIPTION OF THE DRAWINGS

FIG. 5 consisting of FIGS. 5(*a*)–5(*d*), is a time chart for describing the four-pulse method.

FIG. 6 is a schematic sectional view of a liquid crystal cell applicable to the invention.

FIG. 13, consisting of FIGS. 12(*a*)–13(*h*), is a waveform diagram showing a set of time-serial drive signals used in an embodiment of the invention.

DESCRIPTION OF THE PREFERRED EMBODIMENTS

A preferred embodiment of the driving method according to the present invention is further characterized by the following features.

(1) When jumping of scanning lines (i.e., transition from a first mode (ordinary scanning mode) to a second mode) is required, a scanning line (final line) immediately before the scanning is selected twice. Of these, the first selection is for writing data for the final line and the second selection is for writing data for a line subsequent to the final line, respectively, on the final line. Accordingly, in the second selection, effective writing is performed only at pixels on the final line where a threshold change from the reference value is caused due to a temperature deviation.

(2) On the other hand, for writing on a line of the jumping destination (scanning resumption line), a scanning line preceding the scanning resumption line is once selected to effect a resetting of pixels accompanied with a temperature deviation and then data for the scanning resumption line is written on the scanning resumption line in the second selection. As a result, on the preceding scanning line, data is not effectively written at pixels free from a threshold change due to temperature change but is written at pixels accompanied with such a threshold change.

Preferably, the above-mentioned two operations, i.e., two times selection of the final line and two times selection of the scanning resumption line, may be effected in combination.

In the case of combination with a drive method for temperature compensation such as the pixel shift method, the scanning (selection) signal for the first selection and that for the second selection may be different from each other.

It is also possible to place a pause period between the first and the second selection of the final line and select the scanning resumption line during the pause period.

In the case of applying the above-mentioned dummy signal for preventing flicker, it is preferred to effect resetting such that the application of the dummy signal is interrupted at the time of transition to the second mode and resumed based on the scanning resumption line.

Hereinbelow, an embodiment of the present invention will be described with reference to FIG. 10.

Figure 10:
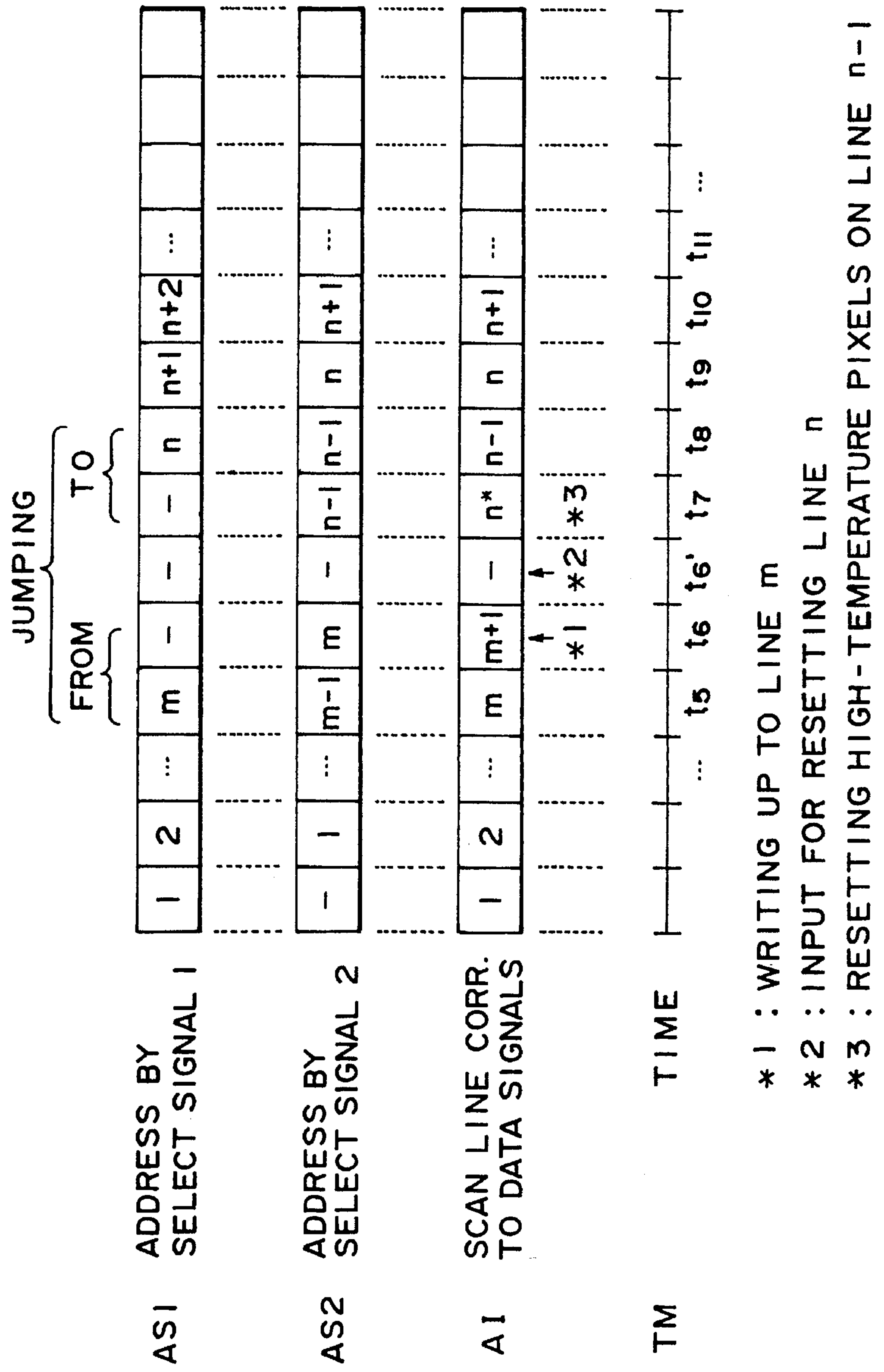
FIG. 10 is a time chart for describing a driving method according to the invention.

Referring to FIG. 10, at AS1 are shown application addresses of selection signal 1, at AS2 are shown application addresses of selection signal 2, at AI are shown addresses of scanning lines to which data signals being applied to data lines correspond, and at TM are shown timing signals in synchronism with the addresses at AS1, AS2 and TM. The writing operation is performed by applying the selection signal 1 to scanning liens 1, 2, 3 . . . line-sequentially, and applying the selection signal 2 to the same scanning lines with a delay of a period corresponding to at least one scanning line. It is preferred to place a standing period of about 200 μs between the selection signals 1 and 2. Data signals corresponding to selected scanning lines are applied at prescribed timing in synchronism with addressing by the selection signals 1 and 2 shown at AS1 and AS2. This is an ordinary scanning.

Herein, the selection signal 1 is a selection signal applied to a scanning line for the first writing at pixels on the scanning line, and the selection signal 2 is a selection signal applied to such a scanning line for the second writing at such pixels on the scanning line. As a result, in case of writing at a pixel free from a threshold change, the signals applied may be such that the display state at the pixel is completed by the first writing and is not changed by the second writing.

The first mode operation is performed in the above-described manner.

Now, description will be made on a second mode operation wherein jumping of scanning lines is required during the above-mentioned writing procedure (first mode operation). In case where jumping to line n is required when ordinary scanning is performed up to line m ($t_5$), the line m is accessed by selection signal 1 and line m–1 by selection signal 2 at time $t_5$. At that time, data signals for pixels on the line m are supplied. Then, application of the selection signal is at rest without accessing any scanning line (time $t_6$). The line m is addressed by the selection signal 2 and, in synchronism therewith, data signals for pixels on the line m+1 are supplied.

As a result, in case where pixels on the scanning line m are at a higher temperature resulting in a threshold change from the reference value, the display states at pixels on the line m are modified to form combined display states in cooperation with pixel states at pixels on the line m+1 by application of data signals for the pixels on the line m+1, thereby compensating for a change in display. In other words, in this case, a desired display state is formed by adjacent two pixels. A novel and unique feature in this embodiment is to provide a period $t_6$ for non-application of the selection signal 1 and twice select the line m. It is also possible to dispose an erasure period according to necessity.

The above-described embodiment of twice selecting the final line is particularly effective when the transition to the second mode operation is required at the time of scanning an intermediate part of the display screen during one vertical scanning and the scanning is resumed at the first scanning line of the display screen and not at an intermediate scanning line. This is because the display quality on the first scanning line as the scanning resumption line is not remarkably degraded even if plural times selection of the scanning resumption described hereinafter, since the first scanning line constitutes only an end of the display screen.

Next, an embodiment of twice selecting a scanning resumption line will be described with reference to the same FIG. 10.

Time period $t_6'$ is an optional period disposed as desired for resetting pixels on line n.

At subsequent time $t_7$, application of the selection signal 1 is at rest and the selection signal 2 is applied to line n–1. In synchronism therewith, data signals (n*) for writing 100% at pixels for resetting on line n. That is, a transmittance of 0% is written for resetting to "black" and a transmittance of 100% is written for resetting to "white". As a result, higher-temperature pixels, if any, on line n–1 may be reset in the same direction as the pixels on line n, thus preparing for selection of the line n so that it is possible to write high temperature data for the line n on the line n–1 at the time of selecting the line n.

At time $t_8$, the selection signal 1 is applied to lien n, and the selection signal 2 is applied to line n–1. (In this way, the scanning resumption lien (n–1) is selected twice at time $t_7$ and $t_8$.) At that time, display signals for the line n are applied. Thereafter, ordinary scanning will be performed in a similar manner as described above.

This embodiment of twice selecting the scanning resumption line but selecting the final line only once is effective when the final selection in the second mode operation is the last or lowermost scanning line since the lowermost line forming an end of the display screen little affects the entire display quality if the local display quality thereat is not complete as a result of one-time selection of the line.

Combination of the above two embodiments provides a further preferred embodiment wherein the final line and the scanning resumption line are respectively selected plural times. This embodiment is optimum when an intermediate part of a picture is partially rewritten.

In another preferred embodiment, the above-mentioned scheme of applying a dummy signal for preventing flicker may be combined with the embodiment of FIG. 10.

More specifically, there has been proposed a scheme wherein flickering encountered in drive of a large screen and high-definition FLC device by the pixel shift method is obviated by applying a dummy signal to one or several non-selected scanning lines so as to provide an apparently increased scanning frequency toward 40 Hz. This scheme has been developed while noting an ordinary scanning period. Accordingly, if such a dummy signal is applied in a drive scheme including jumping of scanning lines, the flicker can be rather increased in some cases. Accordingly, in such a case, it is preferred to temporarily interrupt the application of a dummy signal and readjust the timing of applying the dummy signal in harmony with the frequency of normal scanning on a part of the screen after the jumping. However, in case where the jumping is performed for displaying a small area image such as a mouse cursor, a better display state is given when such a dummy signal is not applied.

Figure 11:
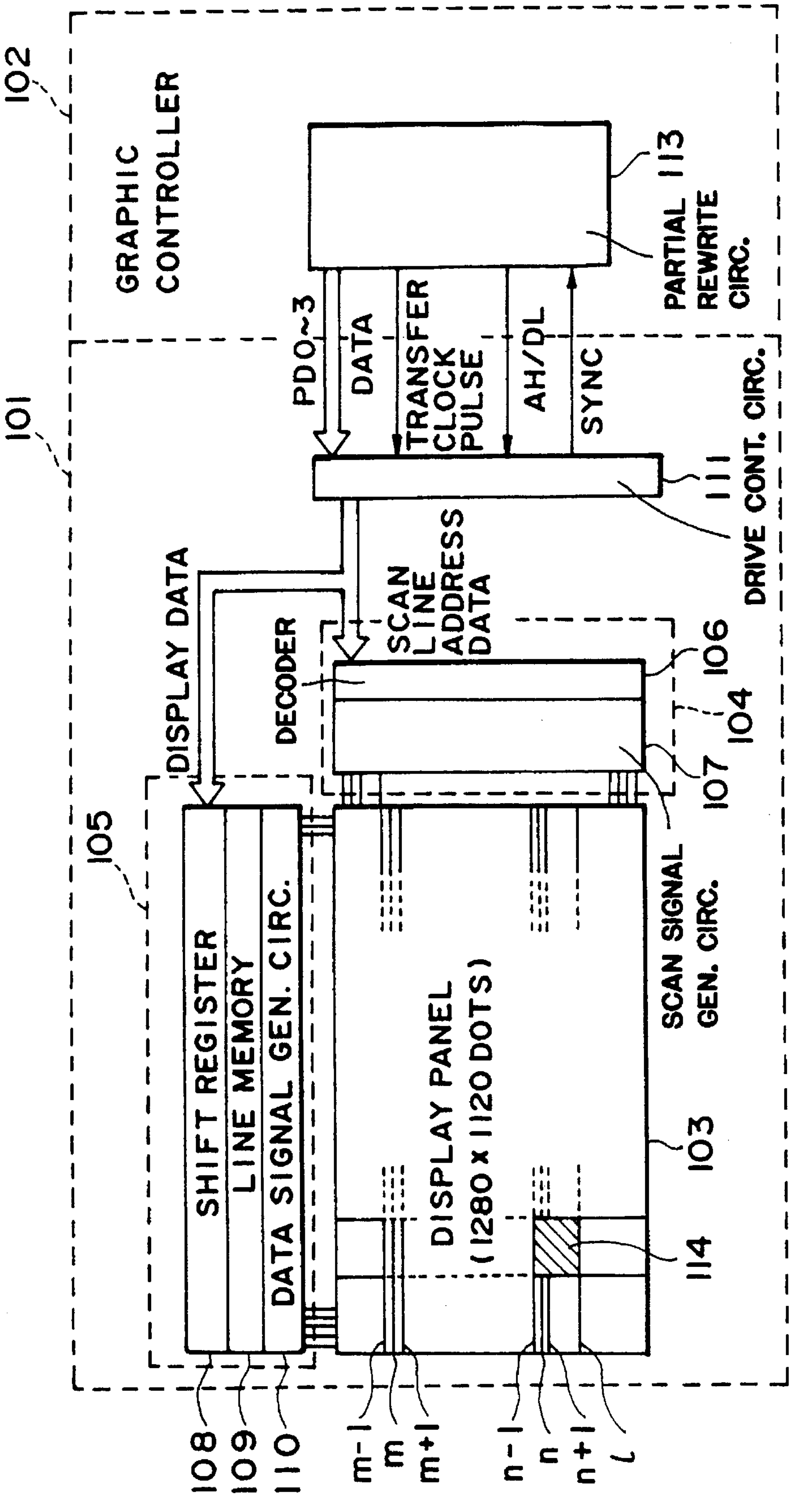
FIG. 11 is a block diagram of a drive circuit applicable to the invention.
Figures 12A, 12B, 12C, 12D, 12E, 12F, 12G:
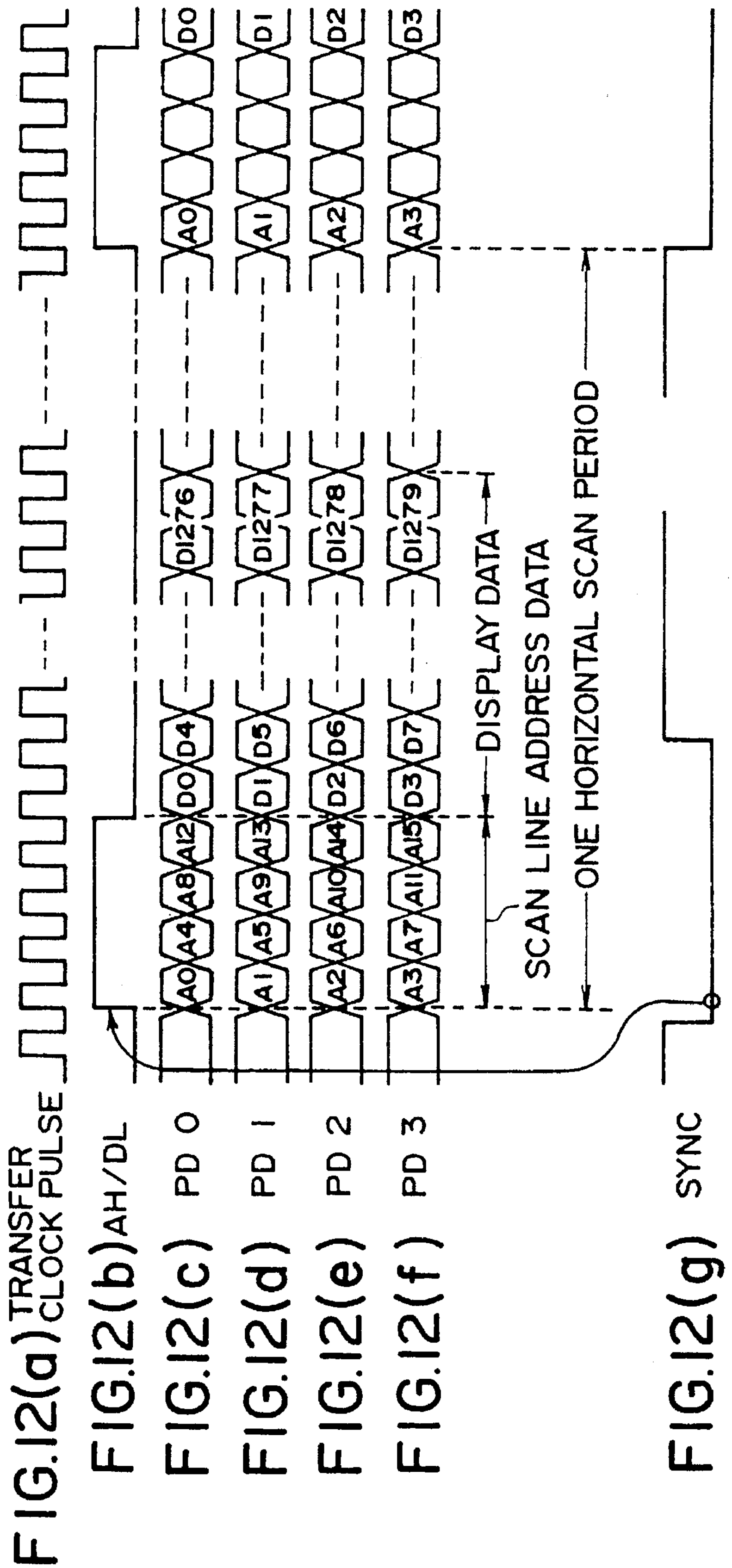
FIG. 12, consisting of FIGS. 12(*a*)–12(*g*), is a time chart for the drive circuit shown in FIG. 11.

FIG. 11 is a block diagram of a control system for a display apparatus according to the present invention, and FIG. 12 is a time chart for communication of image data therefor. Hereinbelow, the operation of the apparatus will be described with reference to these figures.

A graphic controller 102 supplies scanning line address data for designating a scanning electrode and image data PD0–PD3 for pixels on the scanning line designated by the address data to a display drive circuit constituted by a scanning line drive circuit 104 and a data line drive circuit 105 of a liquid crystal display apparatus 101. In this embodiment, scanning line address data (A0–A15) and display data (D0–D1279) must be differentiated. A signal AH/DL is used for the differentiation. The AH/DL signal at a high (Hi) level represents scanning line address data, and the AH/DL signal at a low (Lo) level represents display data.

The scanning line address data is extracted from the image data PD0–PD3 in a drive control circuit 111 in the liquid crystal display apparatus 101 outputted to the scanning line drive circuit 104 in synchronism with the timing of driving a designated scanning line. The scanning line address data is inputted to a decoder 106 within the scanning line drive circuit 104, and a designated scanning electrode within a display panel is driven by a scanning signal generation circuit 107 via the decoder 106. On the other hand, display data is introduced to a shift register 108 within the data line drive circuit 105 and shifted by four pixels as a unit based on a transfer clock pulse. When the shifting for 1280 pixels on a horizontal one scanning line is completed by the shift register 108, display data for the 1280 pixels are transferred to a line memory 109 disposed in parallel, memorized therein for a period of one horizontal scanning period and outputted to the respective data electrodes from a data signal generation circuit 110.

Further, in this embodiment, the drive of the display panel 103 in the liquid crystal display apparatus 101 and the generation of the scanning line address data and display data in the graphic controller 102 are performed in a non-synchronous manner, so that it is necessary to synchronize the graphic controller 102 and the display apparatus 101 at the time of image data transfer. The synchronization is performed by a signal SYNC which is generated for each one horizontal scanning period by the drive control circuit 111 within the liquid crystal display apparatus 101. The graphic controller 102 always watches the SYNC signal, so that image data is transferred when the SYNC signal is at a low level and image data transfer is not performed after transfer of image data for one scanning line at a high level. More specifically, referring to FIG. 11, when a low level of the SYNC signal is detected by the graphic controller 102, the AH/DL signal is immediately turned to a high level to start the transfer of image data for one horizontal scanning line. Then, the SYNC signal is turned to a high level by the drive control circuit 111 in the liquid crystal display apparatus 101. After completion of writing in the display panel 103 with lapse of one horizontal scanning period, the drive control circuit 111 again returns the SYNC signal to a low level so as to receive image data for a subsequent scanning line.

The apparatus of FIG. 11 further includes a partial rewriting circuit 113 containing therein a video RAM. If recorded data in the video RAM is partly rewritten by instruction from a host computer or input from an image sensor, the circuit 113 changes scanning line address data and display data based on the partial rewriting data so as to interrupt the first mode operation and start the second mode operation, i.e., operate on a final line m (FIG. 10). By the change, scanning line address data and display data for a scanning resumption line n–1 and scanning lines thereafter are also changed for a second mode operation as described with reference to FIG. 10, thereby partially rewriting a region 114. If the partial rewriting is terminated on a line l, the first mode operation is resumed. The resumption of the first mode operation may be performed so as to continuously shift from the line l to a subsequent line l+1 (not shown) or move to another line, e.g., a first scanning line. In the latter case, it is desirable to select the line twice and operate thereon in the same manner as on the line m.

Example 1

In a specific example, a liquid crystal cell having a sectional structure as shown in FIG. 6 was prepared. The lower glass substrate 53 was provided with a saw-teeth shape cross section by transferring an original pattern formed on a mold onto a UV-curable resin layer applied thereon to form a cured acrylic resin layer 52.

The thus-formed UV-cured uneven resin layer 52 was then provided with stripe electrodes 51 of ITO film by sputtering and then coated with an about 300 Å-thick alignment film (formed with "LQ-1802", available from Hitachi Kasei K.K.).

The opposite glass substrate 53 was provided with stripe electrodes 51 of ITO film on a flat inner surface and coated with an identical alignment film.

Both substrates (more accurately, the alignment films thereon) were rubbed respectively in one direction and superposed with each other so that their rubbing directions were roughly parallel but the rubbing direction of the lower substrate formed a clockwise angle of about 6 degrees with respect to the rubbing direction of the upper substrate. The cell thickness (spacing) was controlled to be from about 1.0

µm as the smallest thickness to about 1.4 µm as the largest thickness. Further, the lower stripe electrodes 51 were formed along the ridge or ripple (extending in the thickness direction of the drawing) so as to provide one pixel width having one saw tooth span. Thus, rectangular pixels each having a size of 300 µm×200 µm were formed.

Then, the cell was filled with a chiral smectic liquid crystal A showing the following phase transition series and properties.

TABLE 1

(liquid crystal A)

$$\text{Iso.} \underset{81.8^\circ\text{ C.}}{\overset{82.3^\circ\text{ C.}}{\rightleftharpoons}} \text{Ch} \underset{77.3^\circ\text{ C.}}{\overset{76.6^\circ\text{ C.}}{\rightleftharpoons}} \text{SmA}^* \underset{}{\overset{54.8^\circ\text{ C.}}{\rightleftharpoons}} \text{SmC}^*$$

$$\text{SmC}^* \; {}_{-2.5^\circ\text{ C.}}\!\updownarrow_{-20.9^\circ\text{ C.}} \; \text{Cryst}$$

Ps = −5.8 $nC/cm^2$ (30° C.)
Tilt angle = 14.3 deg. (30° C.)
Δε ≈ −0 (30° C.)

FIG. 13 is a waveform diagram showing a set of driven signal waveforms used in this example including scanning signals applied to scanning lines $S_1, \ldots, S_3, \ldots$, data signals applied to a data line I, and a combined voltage signal applied to a pixel at $S_1$- I.

Referring to FIG. 13, pulse A is a scanning selection signal for the first writing which corresponds to selection signal 1 in FIG. 10. Pulse B is a scanning selection signal for the second writing which corresponds to selection signal 2 in FIG. 10. Pulse C is a resetting signal.

In this example, a gradation drive scheme according to the pixel shift method was adopted, so that adjacent two scanning lines were supplied with scanning signals having mutually reverse polarities at corresponding phases.

Referring to FIG. 13, the respective pulses were characterized by parameters of $dt_0$=200 µsec, $dt_1$=50 µsec, $dt_2$=20 µsec, $dt_3$=30 µsec, $|V_1|$=13.8 volts, $|V_2|$=13.8 volts and Vi=−2.75 volts to +2.75 volts, so as to write 100% at Vi=−2.75 volts and 0% at Vi=2.75 volts.

The above-prepared panel incorporated in the apparatus of FIG. 11 was driven by applying drive signals shown in FIG. 13 so as to generate the pulses A (selection signal 1) and B (selection signal 2) according to a time relation shown in FIG. 10 to effect partial rewriting, whereby a good display state was realized so as to prevent formation of recognizable boundaries at uppermost and lowermost sides of the partially rewritten region.

As described above, according to the present invention, it has become possible to prevent degradation of display quality in a scanning scheme involving jumping of scanning lines inclusive of a so-called partial rewriting scheme, thereby realizing gradational display showing good display quality as well as good picture responsiveness.

What is claimed is:

1. A driving method for a liquid crystal device of a type comprising a first electrode substrate having thereon a group of scanning lines, a second electrode substrate having thereon a group of data lines intersecting the scanning lines, and a liquid crystal disposed between the scanning lines and the data lines so as to form a pixel at each intersection of the scanning lines and the data lines, said driving method comprising, depending on a given jumping signal, the following sequential steps of:

(a) simultaneously applying a first scanning selection signal (A) to an m-th scanning line and a second scanning selection signal (B), different from the first scanning selection signal, to an m-th−1 scanning line and, in synchronism with the first and second scanning selection signals, applying data signals to the data lines, each data signal being for determining a display state of an associated pixel on the m-th scanning line and for compensating a display state of an associated pixel on the m-th−1 scanning line;

(b) applying the second scanning selection signal (B) to the m-th scanning line while not applying either the first or the second scanning selection signal to an m-th+1 scanning line and, in synchronism with the second scanning selection signal (B), applying data signals to the data lines, each of the data signals being for compensating the display state of an associated pixel on the m-th scanning line; and (c) after a jumping of scanning lines after execution of said step (b), applying the first scanning selection signal (A) to a p-th scanning line and, in synchronism with the first scanning selection signal, applying data signals to the data lines, each data signal being for determining a display state of an associated pixel on the p-th scanning line.

2. A method according to claim 1, wherein a reset signal (C) is applied to a scanning line immediately before the first scanning selection signal (A) is applied to the scanning line.

3. A driving method for a liquid crystal device of a type comprising a first electrode substrate having thereon a group of scanning lines, a second electrode substrate having thereon a group of data lines intersecting the scanning lines, and a liquid crystal disposed between the scanning lines and the data lines so as to form a pixel at each intersection of the scanning lines and the data lines, said driving method comprising, depending on a given jumping signal, the following sequential steps of:

(a) simultaneously applying a first scanning selection signal (A) to an m-th scanning line and second scanning selection signal (B), different from the first scanning selection signal, to an m-th−1 scanning line and, in synchronism with the first and second scanning selection signals, applying data signals to the data lines, each data signal being for determining a display state of an associated pixel on the m-th scanning line and for compensating a display state of an associated pixel on the m-th−1 scanning line;

(b) after a jumping of scanning lines after execution of said step (a), applying the second scanning selection signal (B) to a p-th−1 scanning line while not applying either the first or second scanning selection signal to a p-th scanning line and, in synchronism with the second scanning selection signal (B), applying data signals to the data lines, each data signal being for compensating a display state of an associated pixel on the p-th−1 scanning line; and (c) simultaneously applying the first scanning selection signal (A) to the p-th scanning line and applying again the second scanning selection signal (B) to the p-th−1 scanning line and, in synchronism with the first and second scanning selection signals, applying data signals to the data lines, each data signal being for determining a display state of an associated pixel on the p-th−1 scanning line.

4. A driving method for a liquid crystal device of a type comprising a first electrode substrate having thereon a group of scanning lines, a second electrode substrate having thereon a group of data lines intersecting the scanning lines, and a liquid crystal disposed between the scanning lines and the data lines so as to form a pixel at each intersection of the scanning lines and the data lines, said driving method comprising, depending on a given jumping signal, the following sequential steps of:

(a) simultaneously applying a first scanning selection signal (A) to an m-th scanning line and a second scanning selection signal (B), different from the first scanning selection signal, to an m-th−1 scanning line and, in synchronism with the first and second scanning selection signals, applying data signals to the data lines, each data signal being for determining a display state of an associated pixel on the m-th scanning line and for compensating a display state of an associated pixel on the m-th−1 scanning line;

(b) applying the second scanning selection signal (B) to the m-th scanning line while not applying either the first or second scanning selection signal to the m-th+1 scanning line and, in synchronism with the second scanning selection signal (B), applying data signals to the data lines, each data signal being for compensating the display state of an associated pixel on the m-th scanning line;

(c) after a jumping of scanning lines after execution of step (b), applying the second scanning selection signal (B) to a p-th−1 scanning line while not applying either the first or second scanning selection signal to a p-th scanning line and, in synchronism with the second scanning selection signal (B), applying data signals to the data lines, each data signal being for compensating a display state of an associated pixel on the p-th−1 scanning line; and (d) simultaneously applying the first scanning selection signal (A) to the p-th scanning line and applying again the second scanning selection signal (B) to the p-th−1 scanning line and, in synchronism with the first and second scanning selection signals, applying data signals to the data lines, each data signal being for determining a display state of an associated pixel on the p-th−1 scanning line.

5. A method according to any of claims 1, 3 or 4, wherein a dummy signal is applied to a non-selected scanning line during scanning while application of the dummy signal is terminated when the jumping of scanning lines occurs.

6. A method according to any of claims 1, 3 or 4, wherein the liquid crystal is a nematic liquid crystal, a cholesteric liquid crystal or a smectic liquid crystal.

7. A method according to any of claims 1, 3 and 4, wherein each pixel has a distribution of threshold for inversion of a display state giving a different area of inversion depending on gradation data.

8. A liquid crystal display apparatus comprising:

(1) a liquid crystal device of the type comprising a first electrode substrate having thereon a group of scanning lines, a second electrode substrate having thereon a group of data lines intersecting the scanning lines, and a liquid crystal disposed between the scanning lines and the data lines so as to form a pixel at each intersection of the scanning lines and the data lines; and (2) driving means for performing, depending on a given jumping signal, the following sequential steps of:

(a) simultaneously applying a first scanning selection signal (A) to an m-th scanning line and a second scanning selection signal (B), different from the first scanning selection signal, to an m-th−1 scanning line and, in synchronism with the first and second scanning selection signals, applying data signals to the data lines, each data signal being for determining a display state of an associated pixel on the m-th scanning line and for compensating a display state of an associated pixel on the m-th−1 scanning line;

(b) applying the second scanning selection signal (B) to the m-th scanning line while not applying either the first or second scanning selection signal to an m-th+1 scanning line and, in synchronism with the second scanning selection signal (B), applying data signals to the data lines, each of the data signals being for compensating the display state of an associated pixel on the m-th scanning line; and (c) after a jumping of scanning lines after execution of step (b), applying the first scanning selection signal (A) to a p-th scanning line and, in synchronism with the first scanning selection signal, applying data signals to the data lines, each data signal being for determining a display state of an associated pixel on the p-th scanning line.

9. A liquid crystal display apparatus comprising:

(1) a liquid crystal device of a type comprising a first electrode substrate having thereon a group of scanning lines, a second electrode substrate having thereon a group of data lines intersecting the scanning lines, and a liquid crystal disposed between the scanning lines and the data lines so as to form a pixel at each intersection of the scanning lines and the data lines; and (2) driving means for performing, depending on a given jumping signal, the following sequential steps of:

(a) simultaneously applying a first scanning selection signal (A) to an m-th scanning line and a second scanning selection signal (B), different from the first scanning selection signal, to an m-th−1 scanning line and, in synchronism with the first and second scanning selection signals, applying data signals to the data lines, each data signal being for determining a display state of an associated pixel on the m-th scanning line and for compensating a display state of an associated pixel on the m-th−1 scanning line;

(b) after a jumping of scanning lines after exeuction of step (a), applying the second scanning selection signal (B) to a p-th−1 scanning line and while not applying either the first or second scanning selection signal to a p-th scanning line and, in synchronism with the second scanning selection (B), applying data signals to the data lines, each data signal being for compensating a display state of an associated pixel on the p-th−1 scanning line; and (c) simultaneously applying the first scanning selection signal (A) to the p-th scanning line and applying again the second scanning selection signal (B) to the p-th−1 scanning line and, in synchronism with the first and second scanning selection signals, applying data signals to the data lines, each data signal being for determining a display state of an associated pixel on the p-th−1 scanning line.

10. A liquid crystal apparatus comprising:

(1) a liquid crystal device of a type comprising a first electrode substrate having thereon a group of scanning lines, a second electrode substrate having thereon a group of data lines intersecting the scanning lines, and a liquid crystal disposed between the scanning lines and the data lines so as to form a pixel at each intersection of the scanning lines and the data lines; and (2) driving means for performing, depending on a given jumping signal, the following sequential steps of:

(a) simultaneously applying a first scanning selection signal (A) to an m-th scanning line and a second scanning selection signal (B), different from the first scanning selection signal, to an m-th−1 scanning line and, in synchronism with the first and second scanning selection signals, applying data signals to the data lines, each data signal being for determining a display state of an associated pixel on the m-th scanning line and for compensating a display state of an associated pixel on the m-th−1 scanning line;

(b) applying the second scanning selection signal (B) to the m-th scanning line while not applying either the first or second scanning selection signal to the m-th+1 scanning line and, in synchronism with the second scanning selection signal (B), applying data signals to the data lines, each data signal being for compensating the display state of an associated pixel on the m-th scanning line;

(c) after a jumping of scanning lines after execution of step (b), applying the second scanning selection signal (B) to a p-th−1 scanning line while not applying either the first or second scanning selection signal to a p-th scanning line and, in synchronism with the second scanning selection signal (B), applying data signals to the data lines, each data signal being for compensating a display state of an associated pixel on the p-th−1 scanning line; and (d) simultaneously applying the first scanning selection signal (A) to the p-th scanning line and applying again the second scanning selection signal (B) to the p-th−1 scanning line and, in synchronism with the first and second scanning selection signals, applying data signals to the data lines, each data signal being for determining a display state of an associated pixel on the p-th−1 scanning line.

* * * * *

UNITED STATES PATENT AND TRADEMARK OFFICE
CERTIFICATE OF CORRECTION

PATENT NO. : 5,598,229

DATED : January 28, 1997

INVENTOR(S) : SHINJIRO OKADA ET AL.

It is certified that error appears in the above-identified patent and that said Letters Patent is hereby corrected as shown below:

SHEET 4

Figure 1A:
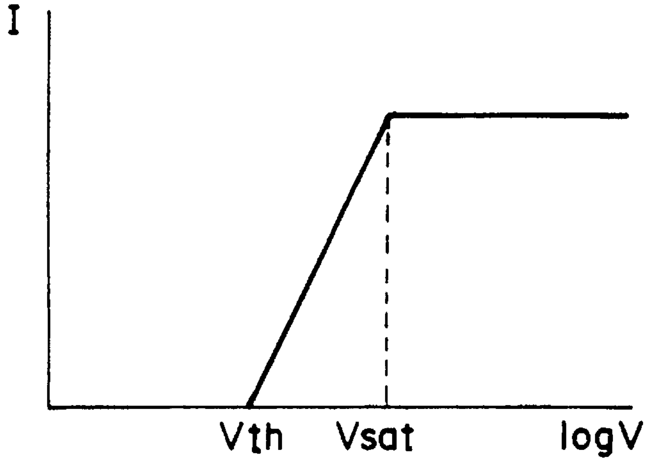
FIG. 1A PRIOR ART
FIGS. 1A and 1B are graphs illustrating a relationship between switching pulse voltage and a transmitted light quantity contemplated in a conventional areal modulation method.
Figure 1B:
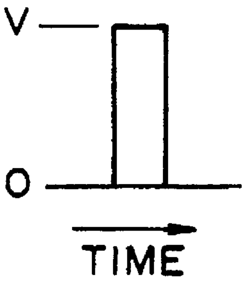
FIG. 1B PRIOR ART
Figure 2A:
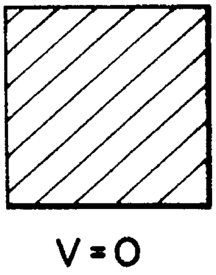
FIG. 2A PRIOR ART
FIGS. 2A–2D illustrate pixels showing various transmittance levels depending on applied pulse voltages.
Figure 2B:
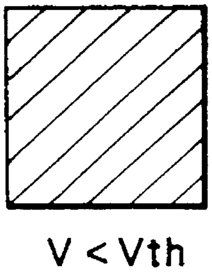
FIG. 2B PRIOR ART
Figure 2C:
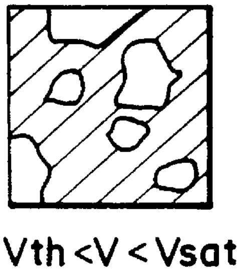
FIG. 2C PRIOR ART
Figure 2D:
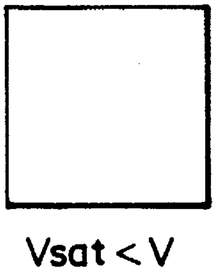
FIG. 2D PRIOR ART
Figure 3:
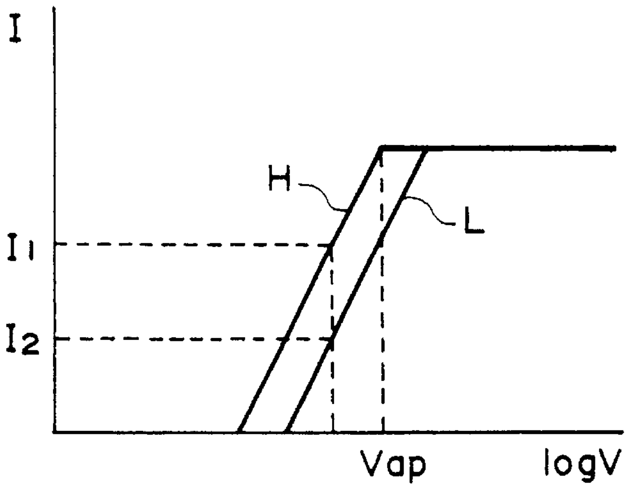
FIG. 3 PRIOR ART
FIG. 3 is a graph for describing a deviation in threshold characteristic due to a temperature distribution.
Figure 4:
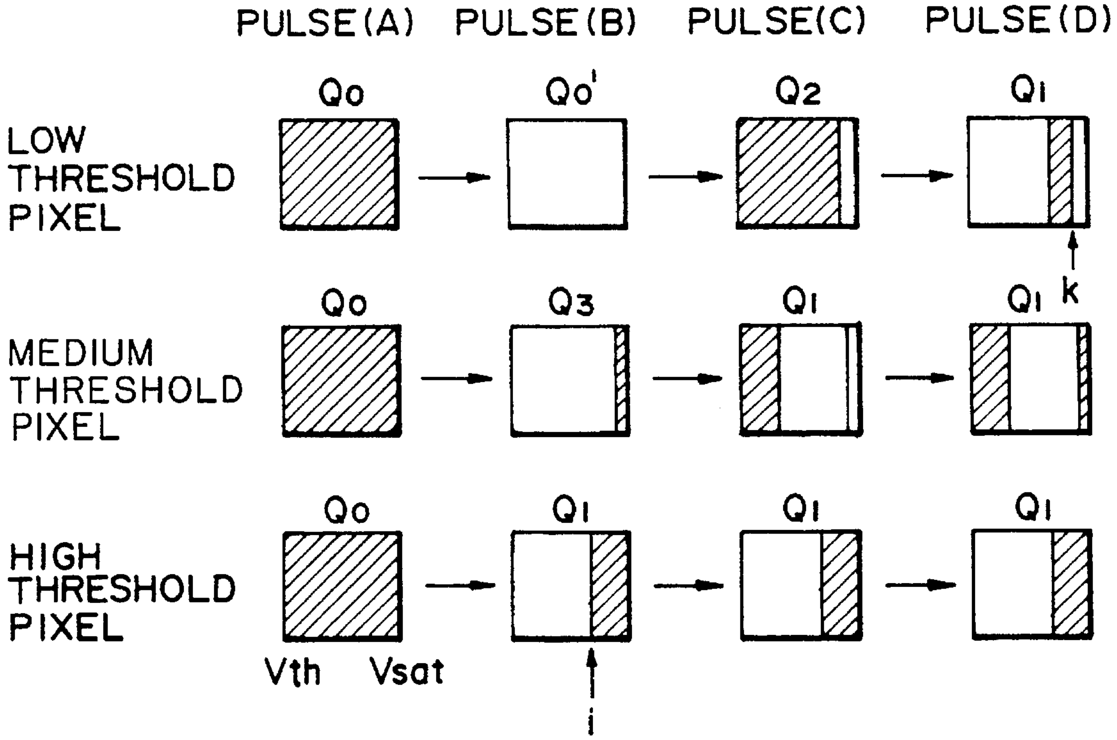
FIG. 4 PRIOR ART
FIG. 4 is an illustration of pixels showing various transmittance levels given in the conventional four-pulse method.
Figure 7A:
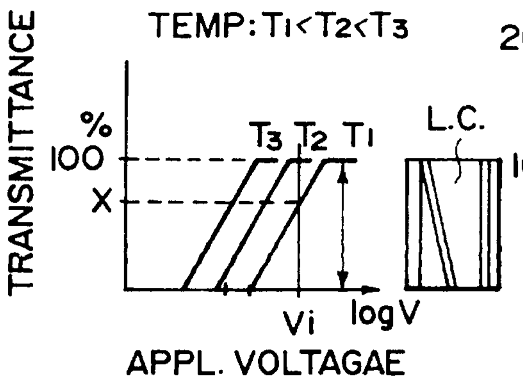
FIG. 7A PRIOR ART
FIGS. 7A–7D are views for illustrating a pixel shift method.
Figure 7B:
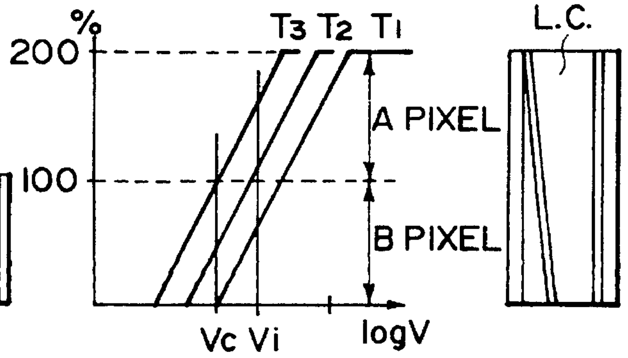
FIG. 7B PRIOR ART
Figure 7C:
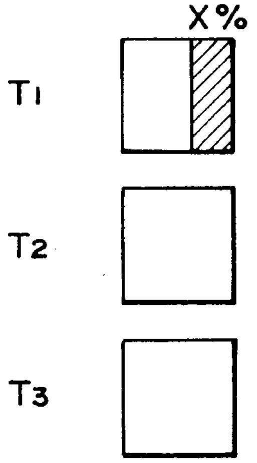
FIG. 7C PRIOR ART
Figure 7D:
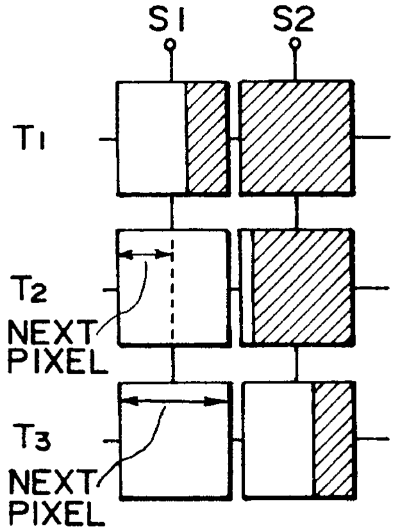
FIG. 7D PRIOR ART
Figures 8A, 8B, 9A, 9B:
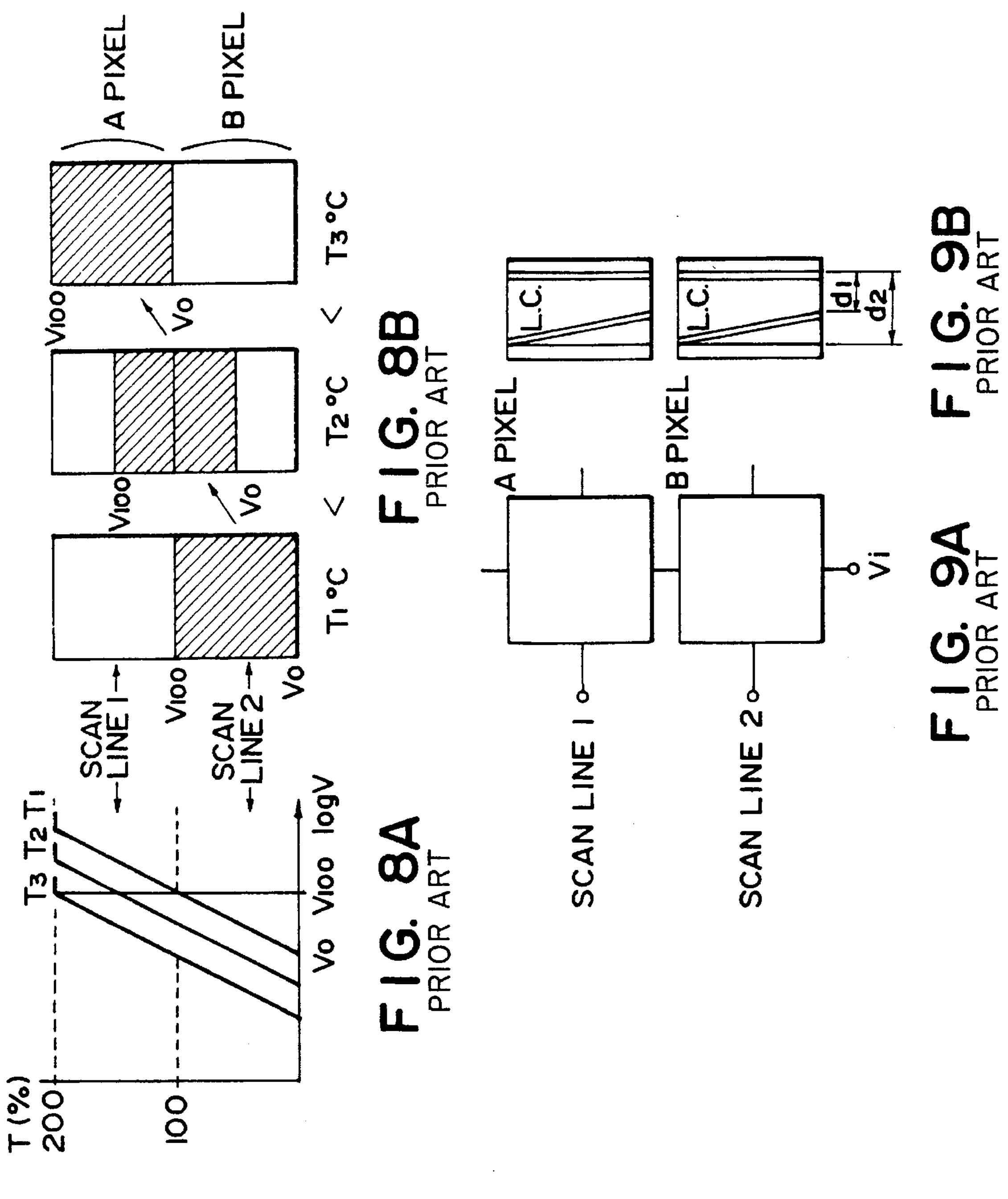
FIG. 8A PRIOR ART
FIG. 8B PRIOR ART
FIG. 9A PRIOR ART
FIG. 9B PRIOR ART
FIGS. 8A, 8B, 9A and 9B are other views for illustrating a pixel shift method.

Fig. 7A, "VOLTAGAE" should read --VOLTAGE--.

COLUMN 1

Line 35, "suppress," should read --suppress--.
Line 49, "No." should read --Nos.--.

COLUMN 2

Line 27, "is" should be deleted.

COLUMN 3

Line 7, "four" should read --"four--.
Line 19, "leftside" should read --left side--.
Line 43, "saw-teeth shape" should read --saw-tooth shaped--.
Line 47, "of" should read --of the--.
Line 55, "of" should read --of the--.

COLUMN 5

Line 64, "which" should be deleted.
Line 65, "using" should read --using a--.

UNITED STATES PATENT AND TRADEMARK OFFICE

CERTIFICATE OF CORRECTION

PATENT NO. : 5,598,229

DATED : January 28, 1997

INVENTOR(S) : SHINJIRO OKADA ET AL.

It is certified that error appears in the above-identified patent and that said Letters Patent is hereby corrected as shown below:

COLUMN 6

Line 14, "with" should read --by--.
Line 55, "5" should read --5,--.

COLUMN 7

Line 3, "12(a)-13(h)," should read --13(a)-13(h)--.
Line 26, "with" should read --by--.
Line 59, "liens" should read --lines--.

COLUMN 8

Line 4, "in case" should read --in a case--.
Line 10, "on" should read --of--.
Line 13, "in case" should read --in a case--.
Line 22, "in case" should read --in a case--.
Line 62, "lien" should read --line--.
Line 64, "lien" should read --line--.

COLUMN 9

Line 29, "in case" should read --in a case--.

COLUMN 10

Line 48, "saw-teeth" should read --saw-tooth--.
Line 49, "shape" should read --shaped--.

UNITED STATES PATENT AND TRADEMARK OFFICE

CERTIFICATE OF CORRECTION

PATENT NO. : 5,598,229

DATED : January 28, 1997

INVENTOR(S) : SHINJIRO OKADA ET AL.

It is certified that error appears in the above-identified patent and that said Letters Patent is hereby corrected as shown below:

COLUMN 11

Table 1, "≈" should read --≑--.

Signed and Sealed this

Fourth Day of November, 1997

Attest:

BRUCE LEHMAN

Attesting Officer

*Commissioner of Patents and Trademarks*